July 25, 1967
I. B. LUECK
3,332,320
COMPENSATING ADAPTER FOR LENS TESTING INSTRUMENT
Filed Dec. 19, 1963
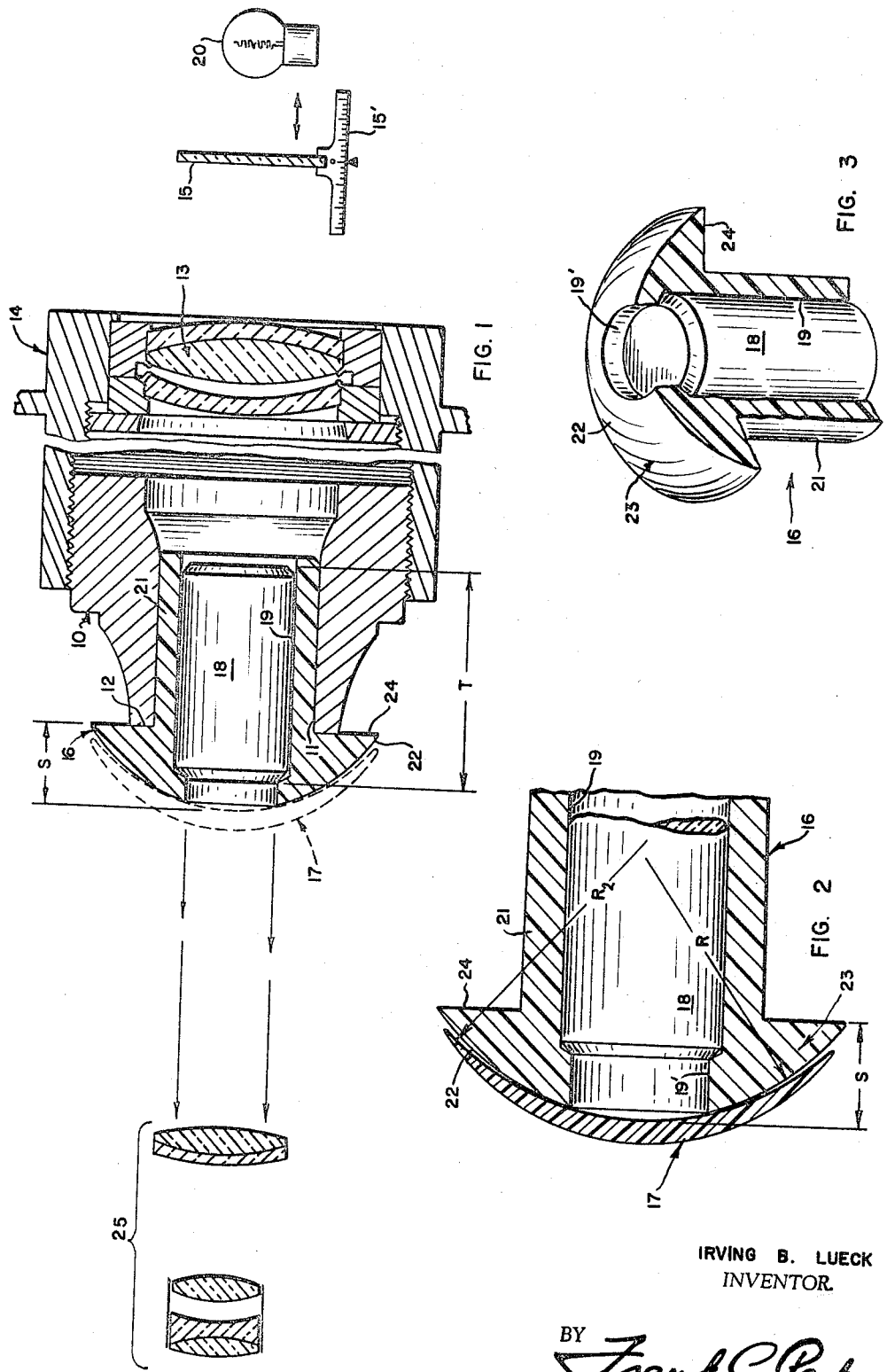
IRVING B. LUECK
INVENTOR.
BY Frank C Parker
ATTORNEY

United States Patent Office 3,332,320
Patented July 25, 1967

3,332,320
COMPENSATING ADAPTER FOR LENS TESTING
INSTRUMENT
Irving B. Lueck, Perinton, N.Y., assignor to Bausch & Lomb Incorporated, Rochester, N.Y., a corporation of New York
Filed Dec. 19, 1963, Ser. No. 331,780
3 Claims. (Cl. 88—56)

The present invention relates to lens testing instruments and more particularly it relates to means for adapting such instruments to testing an eye contact type of ophthalmic lens.

With the increased use and manufacture of eye contact type of ophthalmic lenses, a problem is encountered in properly holding such lenses reliably in proper measuring position on a lens testing instrument. Because of the miniature size and thinness of such lenses, the usual lens mount in such instruments as shown, for instance, in the Patent No. 2,723,594 issued to I. B. Lueck on Nov. 15, 1955, is not properly constructed with regard to size, placement or shape to support the miniature contact lenses.

It is, accordingly, an object of the present invention to provide a compensating adapter for supporting an eye contact type of ophthalmic lens on a lens testing instrument at an optimum position in a reliable manner and without distortion, said adapter being a simple unitary structure, and being low in cost while promoting accuracy in measuring dioptric power of such a lens.

It is a further object to provide such a device which requires no accompanying correction tables and does not require removal of or substitution for existing parts of equipment currently in use since the present invention is added without requiring modification or adjustment of any mechanical or optical part of the instrument.

It is a further object of the invention to provide such a device which supports the ophthalmic contact lens on the area close to its central portion so as to minimize or eliminate from the dioptrometric reading the effect of distortions and warping of the peripheral parts of the lens due to holding pressure.

Further objects and advantages will be apparent in the details of construction and arrangement of parts to those skilled in the related art, reference being had to the specification hereafter taken in connection with the accompanying drawing, in which:

FIG. 1 is a schematic view shown partly in section and broken away of one form of the present invention as a component of a lens testing instrument;

FIG. 2 is an enlarged midsectional view of a contact type of ophthalmic lens in situ on said adapter; and FIG. 3 is a perspective view partly broken away and shown in section of the lens compensating adapter per se.

Lens testing instruments such as represented by the aforementioned patent to Lueck are representative of those currently in use and all are designed to test regular sized ophthalmic lenses having a transverse dimension of about 40 to 50 mm. in accordance with the general principles described in the book entitled, "Ophthalmic Lenses," by H. H. Emsley, 1932 edition, pages 193–195, published by the Hatton Press, Ltd., 72 Fleet Street, London, England. Only the essential parts of said instrument have been shown in the drawing, said parts including a lens mount 10 which is provided with an interior bore 11. On the outer end of said mount is formed an annular lens seating surface 12 whereon the aforesaid regular spectacle lens is ordinarily held by a well-known mechanism, not shown.

It is understood as explained in the above-cited reference that said lens seating surface 12 is located at a fixed distance from a standard lens 13 which is its theoretical equivalent focal length.

Both the lens mount 10 and standard lens 13 are fixed in a frame member 14 of any suitable construction. In the customary construction, a transparent target plate 15, which is illuminated by a lamp 20, is located at the anterior focal point of said standard lens, the target plate being axially movable and being equipped with a longitudinal diopter scale 15' so that the change in the anterior focal length of the standard lens caused by the interposition of the lens to be tested may be indicated on the scale. The image of the target 15 formed by the optical system is viewed by a suitable telescope 25 which is optically aligned therewith rearwardly of the seating surface 12.

According to the present invention, a compensating adapter 16 is provided for holding an eye contact type of ophthalmic lens 17 at a secondary lens position which is located rearwardly of the lens seating surface 12. In order to extend the equivalent focal length of the standard lens 13 into coincidence with said secondary lens position, a plane-parallel block of glass 18 which serves as a ray deviation or compensator is interposed at said equivalent focal length. Advantageously, the use of the ray deviation block 18 obviates the necessity of changing any other optical or mechanical part of the instrument, and the usual operational procedures may be carried on after the block 18 is in proper position without resorting to the use of numerical conversion charts or other extraneous devices.

Mechanically the compensator block 18 is mounted in a bore 19 formed centrally through a cylindrical adapter body 21 of the aforesaid adapter 16 and is held therein by suitable means such as cementing. Said body 21 is slidably fitted into the interior bore 11 of the lens mount 10. At said secondary lens position, a second lens seating surface 22 is formed on an enlarged head portion 23 of said adapter 16 whereon said contact lens 17 is held, said head having an abutment shoulder 24 thereon which bears against seating surface 12. It will be seen that the adapter member 16 serves two purposes, i.e. (1) it supplies the necessary optical compensation to extend the equivalent focal length of the optical system, and (2) it positions the contact lens 17 in an axial testing position which is the aforesaid secondary lens position.

The seating surface 22 on which the contact lens 17 is held is spherically formed with a radius R of substantially .300" which is slightly less than the nominal radius $R_2$, FIG. 2, of the contact side of lens 17 so that the lens 17 contacts the seating surface 22 only in its center portion whereby a true reading of the dioptric power of the lens may be accomplished. The sagittal dimension S of the spherical seating surface 22 governs the diameter of the head 23 and is chosen with proper regard for the dependent length T of the glass block 18 and its refractive index $n$ as stated in the formula $$T - T/n = S$$

Preferably the value of S in the above formula lies between .114 inch and .122 inch. In addition to the maximum limitation for the radius R of the spherical surface 22, the radius should not be so small as to reduce the diameter of the head 23 to a value less than the outer diameter of the lens 17. Otherwise, the holding of the lens 17 on the surface 22 is quite uncertain and more difficult. Part of the difficulty is brought about by the fact that the lenses 17 are normally made from a thermoplastic resin and the lenses are also very thin and flexible near the edge so that any overhang of the lens 17 beyond the head 23 permits some distortion due to holding pressure of the operator's fingers. The axial length dimension T of the glass block 18 also must not be so long that its mounting sleeve 21 interferes with the operation of any nearby part of the instrument. There is also a higher cost involved when lengthening the glass block 18.

The outer end of the bore 19 is reduced to form an aperture 19' in the adapter 16 between the spherical surface 22 and the glass block 18, said aperture serving as the aperture stop for the optical system.

From the foregoing description it will be seen that there is here provided a simple unitary compensating adapter for measuring the dioptric rating of corneal type contact lenses in lens testing instruments such as vertometers and the like, said adapter involving a minimum of parts and obviating the necessity of reference charts, said adapter being economical to produce and easy to use in conformity to the stated objects of the invention.

Although only a preferred form of the invention has been shown and described in detail, other forms are possible and changes may be made in the details of construction, proportions and arrangement of parts thereof without departing from the spirit of the invention as defined in the claims herebelow.

I claim:

1. In a lens testing instrument having a projection lens which is coaxially aligned with a tubular lens mounting member at a fixed distance from a first lens seating surface formed on said member whereon a lens to be tested ordinarily rests and further having an optically aligned illuminated reticle located at a distance from said projection lens, said reticle being movable axially to vary the position of the image of the reticle formed by said projection lens the distance moved by the reticle being a measure of the dioptric power of the lens to be tested, a compensating adapter for use in said instrument for testing an eye contact type ophthalmic lens, said adapter being characterized by a cylindrical body which is demountably held in said tubular mounting member and is further characterized by an enlarged head on which a lateral abutment surface is formed which rests against said first lens seating surface, a second seating surface of spherical shape formed coaxially on said head whereon said eye contact type lens is held for measuring, the radius of the spherical surface being less than the radius of the inner surface of said contact lens so that the lens rests on its central portion, a cylindrical mounting surface formed interiorly on said adapter, a plane parallel surfaced glass block suitably fixed within said cylindrical mounting surface, said glass block having a refractive index value and axial thickness which is related to the distance S between said abutment surface and the theoretical apex of said second seating surface by the equation herebelow, $$T - T/n = S$$

wherein T represents the axial thickness of the block, n designates the refractive index of the glass in the block, and S designates the theoretical sagittal dimension of the spherical surface of said head.

2. A compensating adapter for locating an eye contact type of ophthalmic lens in a correct axial position with respect to an optical system of a lens testing instrument which includes a projection lens and a first lens seating surface which is aligned with and is spaced a fixed distance from said lens, said adapter comprising a cylindrical body which is demountably held in a stationary position in said instrument coaxially of said lens, a lateral shoulder formed on said body at one end thereof which rests against said first lens seating surface to establish the axial position of the body in said optical system, a spherical lens seating surface on which said contact type lens is held, the last-named surface intersecting said shoulder to form an enlarged head on said body, the radius of said spherical surface being substantially .300" and the sagittal dimension thereof being specified by the designation S in the mathematical expression herebelow, an interior surface formed axially though said adapter, a block of transparent optical material which is secured to said interior surface, said block having plane and mutually parallel entrance and exit optical surfaces formed on its opposite ends, the length T between said optical surfaces being mathematically related to the refractive index $n$ of said optical material and the aforesaid sagittal dimension S by the mathematical expression given herebelow, $$T - T/n = S$$

3. A compensating adapter for a lens testing instrument as set forth in claim 2 further characterized by the value of S being between .114 inch and .122 inch.

No references cited.

JEWELL H. PEDERSEN, *Primary Examiner.*

C. E. QUARTON, *Assistant Examiner.*